United States Patent [19]

Dodson

[11] 3,727,008

[45] Apr. 10, 1973

[54] DIAL PULSE AND MULTIPLE FREQUENCY SIGNALLING SENDER/MULTIPLE FREQUENCY SIGNALLING RECEIVER APPARATUS

[75] Inventor: Arthur Edward Dodson, Ottawa, Ontario, Canada

[73] Assignee: Northern Electric Company Limited, Montreal, Canada

[22] Filed: Oct. 18, 1971

[21] Appl. No.: 189,942

[52] U.S. Cl. ............................179/18 ES, 179/18 EB

[51] Int. Cl. ..............................................H04q 3/54

[58] Field of Search ......................179/18 ES, 18 EB, 179/16 EC

[56] References Cited

UNITED STATES PATENTS 3,671,677 6/1972 Lee, Jr. et al. ..................179/18 DA

*Primary Examiner*—Thomas W. Brown
*Attorney*—John E. Mowle

[57] ABSTRACT

A sender/receiver apparatus responds to signals from a central processing unit in a telephone electronic switching office to send multiple frequency (MF) signals and dial pulse (DP) signals. Under direct control of the CPU, the apparatus will also receive MF signals. Control of DP signal timing and the number of dial pulses sent is inherent within the apparatus. The duration of time over which MF signalling extends is controlled directly by the CPU. Interface circuitry allows the CPU to monitor the MF sending and MF receiving functions directly. DP signalling may be monitored indirectly through simultaneous generation of MF signals corresponding to each dial pulse.

9 Claims, 1 Drawing Figure

PATENTED APR 10 1973 3,727,008
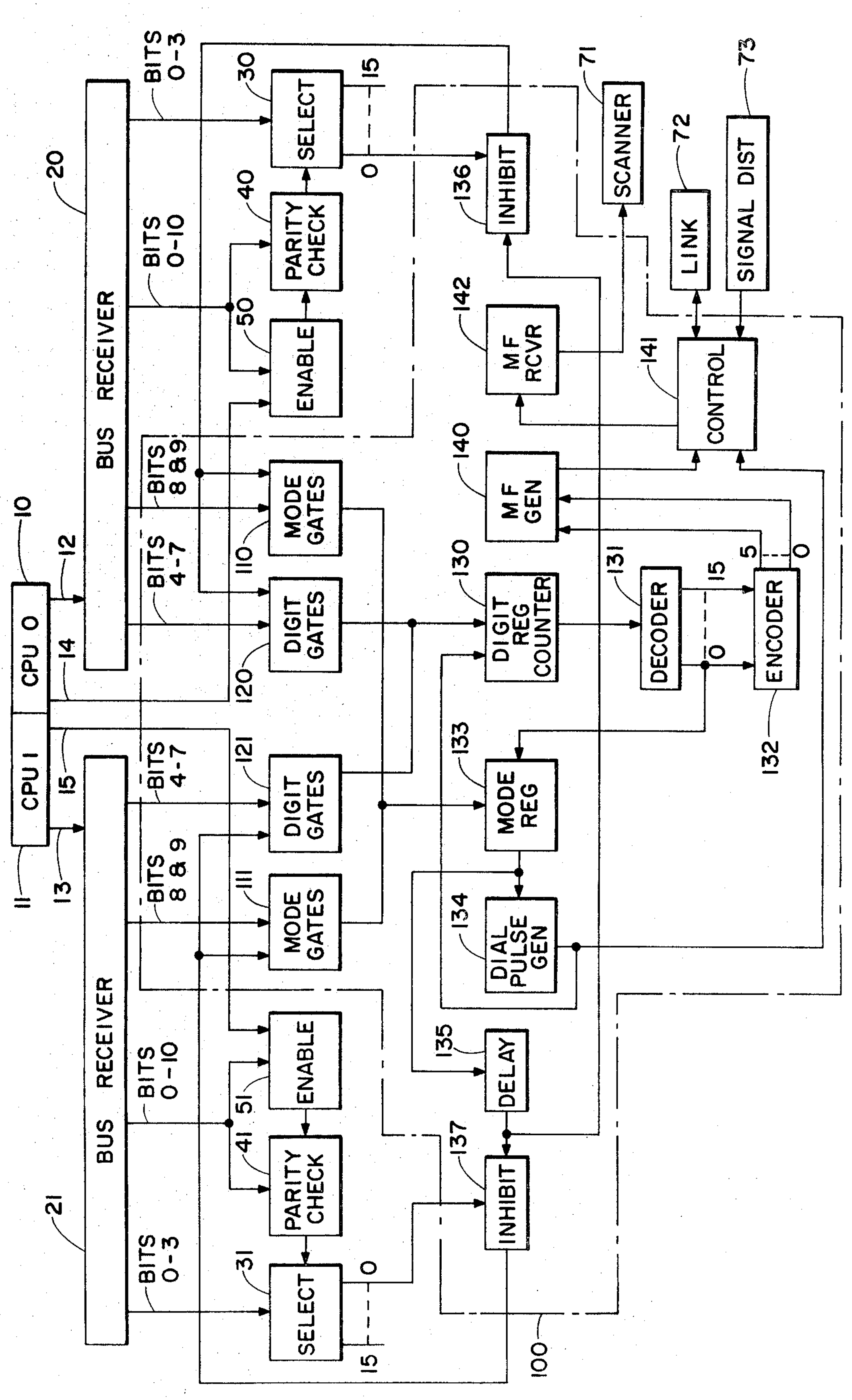

DIAL PULSE AND MULTIPLE FREQUENCY SIGNALLING SENDER/MULTIPLE FREQUENCY SIGNALLING RECEIVER APPARATUS

The present invention relates to telephone systems generally and more particularly to a sending/receiving apparatus in an electronic switching office for sending dual pulse and multiple frequency signals and for receiving multiple frequency signals.

Automatic switching telephone central offices require some means for signalling other switching telephone central offices in order to carry on the process of providing telephone service to subscribers. Tandem or toll switching offices, used typically in the processing of long distance telephone calls, must of necessity be capable of receiving and sending a type of signalling compatible with various types of switching telephone central offices which, from time to time, require long distance services.

Toll office equipment for providing two types of signalling is typically provided for by the installation of both types of signalling apparatus substantially as they each would be found in different central offices. Central offices are compatible with multiple frequency signalling (in a two out of six code) or the much older method of signalling with dial pulses. Multiple frequency signalling is tending to be used in a majority of toll telephone calls being processed. However, a significantly large proportion of dial pulse signalling is still required. Both dial pulse apparatus and multiple frequency signalling apparatus as separate entities are well known and have been in use for a considerable period of time and as such a substantial amount of electromechanical equipment is involved.

Electromechanical apparatus is well known to occupy considerably more space than corresponding electronic solid state apparatus for performing a similar task. Space in any telephone switching office building is at a premium. Toll offices are required to provide long distance services for an ever increasing load of telephone traffic year after year. Therefore, toll traffic volume capabilities have been improved many order of magnitude often by replacing existing electromechanical systems with electronic systems rather than expanding the building to house further electromechanical equipment.

Present day electronic toll switching offices usually comprise a central processing unit (CPU), a switching network and a number of peripheral units required to interface the CPU with the switching network and telephone system's electrical requirements. Typically two CPUs are provided for reliability, one CPU being active, the other CPU being in a standby mode. A dial pulse signalling peripheral unit and a multiple frequency signalling peripheral unit are each accessible from either CPU.

Present day dial signalling peripheral units require that the active CPU be engaged, on a real time basis, in timing the length of each dial pulse being sent. This requires periodic frequent scanning of an actively sending unit by the CPU, such that a significant portion of the CPU's available working time is consumed by this function.

In addition, dial pulse signalling and multiple frequency signalling peripheral units existing as separate entities occupy a significant amount of valuable space in the toll office.

The present invention provides three functions which are dial pulse (DP) sending, multiple frequency (MF) sending and multiple frequency (MF) receiving. One advantage of the present invention is that of a CPU real time saving. The CPU need only actively initiate the sending of DP signals as the functions of timing the dial pulses and sending the required number of dial pulses are inherent in the apparatus. Another advantage is that of a physical space saving. This is realized through the use of solid state circuitry and further realized in that the circuitry is to a significant degree common for providing the DP sending and MF sending functions. Further still, the circuitry for providing the MF receiving function also provides a checking function during the MF sending and DP sending functions. Thus, applied in an electronic toll office the present invention contributes significantly to the traffic volume capacity of the toll office.

The present invention is a dial pulse and multiple frequency signalling sender/multiple frequency signalling receiver apparatus for sending multiple frequency (MF) signals and dial pulse (DP) signals and for receiving MF signals. The apparatus comprises a first means for receiving signals from a central processing unit (CPU) and provides a corresponding parallel binary word, comprising bits. The word has a digit portion and a mode portion. When the bits in the mode portion are in a first predetermined order, a second means generates DP timing signals corresponding to the digit portion. A third means generates first MF signals corresponding to each pulse of the DP timing signals. When the bits in the mode portion are in a second predetermined order, the third means generates second MF signals corresponding to the digit portion. A fourth means sends DP signals corresponding to the DP timing signals to a network and the first MF signals to the CPU, and second MF signals to the network and to the CPU. The fourth means, in the absence of signals generated by the second and/or third means, is capable of receiving MF signals from the network and directs the received MF signals to the CPU.

An embodiment of the invention will now be described with reference to the attached drawing, which is a block circuit diagram of a sender/receiver apparatus in accordance with the invention.

The drawing shows a central processing unit, channel 0, (CPU0) 10 and a central processing unit, channel 1 (CPU1) 11 connected to first and second bus receivers 20 and 21 respectively via first and second information buses 12 and 13 respectively. Each of the buses 12 and 13 consist of 11 signal paths. Each of the bus receivers 20 and 21 have 11 binary bit outputs, bit lines 0–10. The bit lines 0–3, from first bus receiver 20, are connected to a first select circuit 30. Similarly, bit lines 0–3, from the second bus receiver 21, are connected to a second select circuit 31. Bit lines 0–10, from the first bus receiver 20, are connected to a first enable circuit 50 and a first parity check circuit 40. Similarly, bit lines 0–10, from the second bus receiver 21, are connected to a second enable circuit 51 and a second parity check circuit 41. The CPU0 10 and the CPU1 11 are connected via first and second enable leads 14 and 15 to the first and second enable circuits 50 and 51 respectively. The outputs of the first and second enable circuits 50 to 51 are connected to the enable inputs of the first and second parity check circuits 40 and 41 respectively. The outputs of the first and second parity check circuits 40 and 41 are connected to the enable inputs of the first and second select circuits 30 and 31 respectively. Each select circuit has 16 select output leads 0–15 which have common access to 16 sender/receiver circuits.

For convenience, in the drawing, only one sender/receiver circuit 100 is shown. The select output lead 0 of each of the first and second select circuits 30 and 31, is connected to first and second inhibit circuits 136 and 137 respectively. The output from the first inhibit circuit 136 is connected to the enable inputs of a first mode gates circuit 110 and a first digit gates circuit 120. Similarly the output of the second inhibit circuit 137 is connected to enable inputs of a second mode gates circuit 111 and a second digit gates circuit 121. The bit lines 4–7, from the first bus receiver 20, are connected to the first digit gates circuit 110. Similarly the bit lines 4–7 from the second bus receiver 21, are connected to the second digit gates circuit 111. The bit lines 8 and 9, from the first bus receiver 20, are connected to the first mode gates circuit 120. Similarly, the bit lines 8 and 9, from the second bus receiver 21, are connected to the second mode gates circuit 121. The respective outputs of the first and second digit gates circuits 110 and 111 are wired together. Similarly, the respective outputs of the first and second mode gates circuits 120 and 121 are wired together.

The inputs of a digit register counter circuit 130 are connected to the wired-together outputs of the first and second digit gates circuits 120 and 121. The output of the digit register counter circuit 130 is connected to the input of a one out of 16 decoder 131 having decode output leads 0–15. The inputs of a mode register 133 are connected to the wired-together outputs of the first and second mode gates circuits 110 and 111. The decode output lead 0 of the decoder 131 is connected to the reset input of the mode register 133. The output of the mode register 133 is connected to the enable input of a dial pulse (DP) generator 134 and to the input of a delay circuit 135. The output of the delay circuit 135 is connected to the inhibit inputs of first and second inhibit circuits 136 and 137. The decode output leads 1–15 of the decoder 131 are connected to a two out of six encoder 132 and the six outputs 0–5 of the encoder circuit 132 are connected to a multiple frequency (MF) generator 140. The output of the MF generator 140 is connected to the MF input of a control circuit 141. The output of the dial pulse generator 134 is connected to the DP input of the control circuit 141 and to the clock input of the digit register counter 130.

The MF output of the control circuit 141 is connected to the input of a multiple frequency receiver 142, the output of which is connected to a scanner 71. The signalling terminal of the control circuit 141 is connected to a link circuit 72. A signal distributor 73 is connected to the control input of the control circuit 141.

The circuitry for implementing each individual circuit block function is not described herein. Said circuitry is generally well known to those skilled in the art and may be fabricated in a number of alternate forms.

In operation, one of the CPU's is in active control of the telephone office while the other of the CPU's operated in a standby mode. For the purpose of describing the function of the block circuitry in the drawing, CPU0 10 is assumed to be in active control.

Signals transmitted from the CPU0 10 along the first information bus 12 are received by the first bus receiver 20. These signals appear at eleven outputs of the bus receiver 20, for distribution, in the form of a parallel binary word having bits 0–10.

Bits 0–10 are received by the first parity check circuit 40 and the first enable circuit 50 from the first bus receiver 20. The first enable circuit 50 receives an enable signal from the CPU0 10 via the first enable lead 14. The first enable circuit 50 responds, during the presence of the enable signal, to at least one ONE bit in the bits 0–10 to produce an enable pulse. The enable pulse is received by the first parity check circuit 40. When the first parity check circuit 40 verifies that acceptable parity exists in the word (i.e. bits 0–10) the enable pulse is gated through the first parity check circuit 40 to the first select circuit 30. The first select circuit 30 receives bits 0–3 from the bus receiver 20 and decodes these bits to select one out of 16 output leads 0–15. The enable pulse is directed by the first select circuit 30 to the selected output lead. For example, if the bits 0–3 are all zeros; the enable pulse would be directed to the output lead 0. Thus the enable pulse is directed to the first inhibit circuit 136 in the sender/receiver 100. At this point in the operation a particular sender/receiver 100 has been selected according to the bits 0–3, in the presence of an enable signal from the CPU0 10 and the verification of acceptable parity in the bits 0–10.

In the selected sender/receiver 100, the first inhibit circuit 136 enables the first mode gates circuit 110 and the first digit gates 120 to load the bits 8 and 9 and the bits 4–7 into the mode register 133 and into the digit register counter 130 respectively. After a predetermined period of time sufficient for the above loading action to be complete, the first enable circuit 50 terminates the enable pulse. Thus the mode and digit counter register 133 and 130 cannot be further loaded with bits from the first bus receiver 20 until another enable pulse is received by the first inhibit circuit 136.

The sender/receiver 100 is capable of sending multiple frequency (MF) signals and dial pulse (DP) signals. The type of signalling is dependent upon the bits in the mode register (i.e. bits 8 and 9). When MF signalling is dictated by the bits 8 and 9 in the mode register 133, the bits 4–7 in the digit counter register 130 are decoded by the decoder 131 so that one out of 15 decoder leads 0–15 is selected. For example if the bit 4 is a ONE and the bits 5–8 are all ZERO then decoder lead 14 would be selected. The encoder 132 in turn responds to the decoder lead selection by selecting two out of six encoder leads 0–5. Continuing the above example, the decoder lead 14 being selected in turn causes encoder leads 4 and 5 to be selected.

The MF generator 140 responds to each encoder lead selection by generating a corresponding frequency. Since two encoder leads are always selected simultaneously two frequencies are generated by the MF generator 140 and appear as an MF signal at the output of the MF generator 140. The MF signal is fed to the MF input of the control circuit 141 for sending, a function to be described later.

The CPU0 10 terminates the generation of an MF signal by selecting the sender/receiver 100 as previously described. The bits 4–7 loaded into the digit register counter 130 cause the decoder 131 to select the decode lead 0. For example, the bits 4–7 being all ONEs are loaded into the digit register counter 130 from the first bus receiver 20 via the first digit gate circuit 120. The decoder 131 responds to the all ONE bits in the digit register counter 130 by selecting the decoder lead 0.

The above description of the generation of required MF signals generally applies to the generation of dial pulse signalling. In this case, the signal timing requirement (that is, the termination of signal generation) is not controlled from the active CPU but is inherent in the sender/receiver unit 100.

Dial pulse (DP) signalling is initiated when the bits 8 and 9 received by the mode register 133 are in a predetermined order. Accordingly the dial pulse generator 134 is enabled from the output of the mode register 133 and starts to generate timing pulses. The delay circuit 135 and the first and second inhibit circuits 136 and 137 act to inhibit either CPU0 10 and/or CPU1 11 from reselecting a sender/receiver unit which is actively engaged in the generation of dial pulses. The delay circuit 135 responds to the output of the mode register 133 to produce a delayed inhibit signal. Once the mode register 133 and digit register counter 130 have had sufficient time to be initially loaded, the delayed inhibit signal appears at the inputs of the first and second inhibit circuits 136 and 137. The first and second inhibit circuits 136 and 137 respond to the delayed inhibit signal to inhibit any additional directed enable pulse from the first and/or second select circuits 30 and 31. Thus the selection of an active sender/receiver 100 when generating DP signalling is precluded. Timing pulses generated by the dial pulse generator 134 are received by the control circuit 141 and the digit register counter 130. The timing pulses are counted by the digit register counter circuit 130 and the resultant is continuously decoded by the decoder 131. As the dial pulse generator 134 continues to generate timing pulses, eventually the decode lead 0 is selected. The decode lead 0 selection resets the mode register 133 thereby inhibiting further timing pulse generation by the dial pulse generator 134. Thus the number of timing pulses generated corresponds to the binary number (bits 4–7) initially loaded into the digit register counter 130.

In other words, the number of timing pulses required is stored in binary form in the digit register counter 130. When a timing pulse is received by the digit register counter 130 from the dial pulse generator 134, the digit register counter 130 counts incrementally once thereby storing the remaining number of dial pulses required. The decoder 131 responds by selecting a corresponding decode lead. This is repeated until the decode lead 0 is selected.

During the generation of the timing pulses, the encoder 132 is actively encoding the output of the decoder 131 according to the selection of the decode leads 1–15 so that, as described previously, MF signals corresponding to each dial pulse are generated.

The control circuit 141 receives control signals from the CPU0 10 via the signal distributor 73 so that under various conditions the required signalling is connected between the sender/receiver 100 and the link circuit 72. When multiple frequency signalling is required the output from the MF generator is fed via the control circuit 141 to the multiple frequency (MF) receiver 142 and the link circuit 72. The link circuit 72 provides connection between the sender/receiver 100 and the switching network in the telephone office. The MF receiver 142 decodes the MF signal so that a two out of six binary digit code is provided to the scanner 71.

When dial pulse signalling is required the timing pulses generated by the dial pulse generator 134 as previously described are serially received by the control circuit 141. The control circuit 141 repeats the timing pulses to generate dial pulse signals which are connected to the link circuit 72. Simultaneously, the MF generator 146 generates MF signals corresponding to each dial pulse as previously described. The MF signals are connected via the control circuit 141 to the MF receiver 142. The MF receiver decodes the MF signals as previously described so that the two out of six binary code is provided to the scanner 71.

When the sender/receiver circuit 100 is receiving MF signals from the link circuit 72, the control circuit 141 connects the received MF signals to the MF receiver 142. The MF receiver decodes the MF signals as previously described so that the two out of six code is provided to the scanner 71. The scanner 71 provides an interface between the CPU0 10 and the sender/receiver circuit 100 so that the CPU0 10 is able to receive an indication of the signalling.

The scanner 71 and the signal distributor 73 provide an interface between the CPU and CPUs and up to 16 sender/receiver circuits. The link circuit 72 likewise provides an interface between the switching network and up to 16 sender/receiver circuits.

What is claimed is:

1. In a telephone electronic switching office having a central processing unit (CPU) and a switching network, a dial pulse and multiple frequency signalling sender/multiple frequency signalling receiver apparatus for sending multiple frequency (MF) signals and dial pulse (DP) signals and for receiving MF signals, the apparatus comprising:

first means for receiving signals from the CPU and for providing a corresponding parallel binary word, the word comprising bits, said word having a digit portion and a mode portion, second means for generating dial pulse (DP) timing signals when the bits in the mode portion are in a first predetermined order, said DP timing signals corresponding to the digit portion, third means for generating first MF signals when the bits in the mode portion are in the first predetermined order, said first MF signals corresponding to each pulse of the DP timing signals and for generating second MF signals when the bits in the mode portion are in a second predetermined order, said second MF signals corresponding to the digit portion, fourth means for sending DP signals corresponding to the DP timing signals to the switching network and the first MF signals generated by the third means to the CPU, and for sending the second MF signals generated by the third means to the switching network and to the CPU, and in the absence of signals generated by the second and/or third means for receiving MF signals from the switching network and directing the received MF signals to the CPU.

2. A dial pulse and multiple frequency signalling sender/multiple frequency signalling receiver apparatus for sending multiple frequency (MF) signals and dial pulse (DP) signals and for receiving MF signals in a telephone switching office having at least one central processing unit (CPU) and a switching network, the apparatus comprising:

first means for receiving information signals from the CPU on an information bus and providing a corresponding parallel binary word, the word comprising bits, said word having a select portion, a digit portion and a mode portion, enable means for generating an enable pulse in response to at least one ONE bit, in the word, in coincident combination with a CPU enable signal from the CPU, the generated enable pulse being in coincidence with and of a shorter duration of time than the duration of time over which the word is present, parity means for gating the enable pulse in response to a predetermined plurality of sums of the bits in the word, select means for directing the gated enable pulse to one of a plurality of select leads as dictated by the arrangement of the bits in the select portion, a plurality of signal generating means, each separately connected to a select lead of the plurality of select leads, each signal generating means for generating DP timing signals corresponding to the digit portion and first MF signals corresponding to each pulse of the DP timing signals in response to the presence of a directed enable pulse from the select means when the bits in the mode portion are in a first predetermined order, and for generating second MF signals corresponding to the digit portion in response to the presence of a directed enable pulse from the select means when the bits in the mode portion are in a second predetermined order, a plurality of control means, each control means separately connected between one of the plurality of signal generating means and the switching network, each control means for responding to the presence of DP timing signals and first MF signals from the signal generating means by generating DP signals corresponding to the DP timing signals and directing said DP signals to the switching network and directing the first MF signals to the CPU, for responding to the presence of second MF signals from the signal generating means by directing said second MF signals to the switching network and to the CPU, and in the absence of DP timing signals and/or MF signals from the signal generating means for accepting MF signals from the switching network and directing said accepted MF signals to the CPU, a plurality of receiver means each connected between one of the plurality of control means and the CPU, each receiver means for receiving MF signals from the control means and interfacing said received MF signals to the CPU.

3. An apparatus as defined in claim 1 in which each of the plurality of signal generating means comprises:

a digit register counter for receiving and storing the digit portion and for altering the digit portion so stored incrementally by one in response to the presence of a count signal, a mode register for receiving and storing the mode portion, the mode register being resetable in response to the presence of a reset signal, a decoder for decoding the digit portion in the digit register, thereby selecting one of a plurality of decoder output leads, one of the plurality of the decoder output leads being connected to the mode register so that when the decoder output lead connected to the mode register is selected the reset signal is supplied to the mode register, an encoder for selecting at least two encoder output leads from a plurality of encoder output leads in response to the selection of a decoder output lead other than the decoder output lead connected to the mode register, a plurality of frequency signal generators, each having an input separately connected to an encoder output lead, each for generating a predetermined frequency in response to the selection of the encoder output lead to which the input of that frequency signal generator is connected, the outputs of the frequency signal generators being connected in common to the control means, means for generating DP timing signals when the bits in the mode portion in the mode register are of the first predetermined order, the output of the means for generating the DP timing signals being connected to the control means and to the digit register counter, whereby each DP timing signal also serves as the count signal, delay means for generating a delayed gating signal after the bits in the mode portion stored in the mode register have been in the first predetermined order for a predetermined period of time, inhibit means for inhibiting the signal generating means from responding to a further directed enable pulse signal from the select means during the generation of DP timing signals, in response to the delayed gating signal.

4. An apparatus as defined in claim 2 in which said word in addition has a parity portion.

5. An apparatus as defined in claim 4 in which the select portion consists of four bits, the digit portion consists of four bits, the mode portion consists of two bits and the parity portion consists of at least one bit.

6. An apparatus as defined in claim 5 in which the plurality of decoder output leads consists of 16 leads and the plurality of encoder output leads consists of six leads.

7. An apparatus as defined in claim 3 in which said word in addition has a parity portion.

8. An apparatus as defined in claim 7 in which the select portion consists of four bits, the digit portion consists of four bits, the mode portion consists of two bits and the parity portion consists of at least one bit.

9. An apparatus as defined in claim 8 in which the plurality of decoder output leads consists of 16 leads and the plurality of encoder output leads consists of six leads.

* * * * *